(12) United States Patent
Davis et al.

(10) Patent No.: US 10,271,116 B2
(45) Date of Patent: Apr. 23, 2019

(54) MOBILE MONITORING PROCESS WITH GAS SENSING TECHNOLOGY

(71) Applicant: Karmic Energy LLC, Midland, TX (US)

(72) Inventors: Jared Davis, Midland, TX (US); Fred A. Darnell, Jr., Charlotte, NC (US); Trent Crawford, Midland, TX (US)

(73) Assignee: Karmic Energy LLC, Midland, TX (US)

( * ) Notice: Subject to any disclaimer, the term of this patent is extended or adjusted under 35 U.S.C. 154(b) by 0 days.

(21) Appl. No.: 15/193,013

(22) Filed: Jun. 25, 2016

(65) Prior Publication Data

US 2016/0381440 A1 Dec. 29, 2016

Related U.S. Application Data

(60) Provisional application No. 62/184,568, filed on Jun. 25, 2015, provisional application No. 62/248,470, filed on Oct. 30, 2015.

(51) Int. Cl.
*H04Q 9/00* (2006.01)
*G01F 23/00* (2006.01)

(52) U.S. Cl.
CPC ............... *H04Q 9/00* (2013.01); *G01F 23/00* (2013.01); *G01F 23/0076* (2013.01); *H04Q 2209/00* (2013.01); *H04Q 2209/40* (2013.01); *H04Q 2209/50* (2013.01)

(58) Field of Classification Search
CPC .......... H04Q 2209/00; H04Q 2209/10; H04Q 2209/40; H04Q 2209/50; H04Q 2209/70; H04Q 2209/82; H04Q 2209/88; H04Q 2209/886; G01D 4/006; G01F 23/00

USPC ............. 340/870.01, 870.02, 870.07, 870.09
See application file for complete search history.

(56) References Cited

U.S. PATENT DOCUMENTS

| | | | |
|---|---|---|---|
| 6,502,032 B1 | 12/2002 | Newman | |
| 6,700,503 B2 * | 3/2004 | Masar | G01F 15/063 340/870.01 |
| 7,106,065 B1 | 9/2006 | Graf | |
| 7,353,034 B2 | 4/2008 | Haney | |

(Continued)

FOREIGN PATENT DOCUMENTS

WO      2015081328 A1     6/2015

OTHER PUBLICATIONS

International Search Report issued in counterpart application Serial No. PCT/US2016/039448 dated Sep. 14, 2016.

*Primary Examiner* — Hai Phan
*Assistant Examiner* — Franklin D Balseca
(74) *Attorney, Agent, or Firm* — Brian J. Colandreo; Mark H. Whittenberger; Holland & Knight LLP

(57) ABSTRACT

A system and method for mobile monitoring is provided. The system may include a mobile communications unit and a plurality of global positioning system "GPS" enabled sensors each configured to wirelessly transmit geographic data, liquid level data, and gas sensing data to the mobile communications unit. The system may further include a database configured to store a location associated with the mobile communication unit, the database further configured to receive the geographic data and liquid level data from the plurality of GPS enabled sensors, the database also configured to store baseline site survey data corresponding to the locations associated with the mobile communications unit.

19 Claims, 19 Drawing Sheets

(56) References Cited

U.S. PATENT DOCUMENTS

| | | | |
|---|---|---|---|
| 7,456,596 B2 | 11/2008 | Goodall et al. | |
| 7,520,155 B2* | 4/2009 | Sasaki | H01M 8/04007 73/1.06 |
| 7,729,852 B2* | 6/2010 | Hoiness | G01D 4/006 701/428 |
| 8,373,568 B2* | 2/2013 | Moe | G08B 21/16 340/632 |
| 8,665,082 B2* | 3/2014 | Glenn | G08B 25/10 340/3.1 |
| 2001/0038342 A1* | 11/2001 | Foote | G01D 4/004 340/870.02 |
| 2007/0152813 A1* | 7/2007 | Mathur | G05B 19/4183 340/539.22 |
| 2008/0272933 A1* | 11/2008 | Cahill-O'Brien | G01D 4/006 340/870.02 |
| 2010/0241277 A1* | 9/2010 | Humphrey | G01F 23/0076 700/282 |
| 2013/0127904 A1* | 5/2013 | Dove | G06F 3/0488 345/629 |
| 2013/0282291 A1 | 10/2013 | Dasgupta | |
| 2014/0160885 A1 | 6/2014 | Tenghamn | |
| 2014/0173873 A1* | 6/2014 | Butterfield, IV | G01B 5/25 29/407.09 |
| 2014/0347194 A1 | 11/2014 | Schnitz et al. | |
| 2015/0102940 A1* | 4/2015 | Keech | H04Q 9/00 340/870.02 |
| 2017/0184560 A1* | 6/2017 | Crescini | G01D 11/00 |
| 2017/0248514 A1* | 8/2017 | Pavey | G01N 33/0057 |

* cited by examiner

MOBILE MONITORING PROCESS WITH GAS SENSING TECHNOLOGY

CROSS-REFERENCE TO RELATED APPLICATIONS

This application claims the benefit of U.S. Provisional Application having Ser. No. 62/184,568, filed Jun. 25, 2015, and U.S. Provisional Application having Ser. No. 62/248,470, filed Oct. 30, 2015, of which the entire contents are incorporated herein by reference.

TECHNICAL FIELD

This disclosure relates to oilfield monitoring systems and, more particularly, to an automated method for accurate oilfield monitoring without requiring the presence of a user onsite.

BACKGROUND

Maintaining and monitoring an oilfield is a tedious and time intensive task. Typically, a user must be present on-site in order to determine the status of the tanks and the overall operability of the entire system, which may include, but is not limited to, tanks, pipes, valves, etc. In some cases, and entirely without warning, system or process failures may bring a multi-million dollar operation to a halt in seconds.

SUMMARY OF DISCLOSURE

In a first implementation, the system may include a mobile communications unit and a plurality of global positioning system "GPS" enabled sensors each configured to wirelessly transmit geographic data, liquid level data, and gas sensing data to the mobile communications unit. The system may further include a database configured to store a location associated with the mobile communication unit, the database further configured to receive the geographic data and liquid level data from the plurality of GPS enabled sensors, the database also configured to store baseline site survey data corresponding to the locations associated with the mobile communications unit.

One or more of the following features may be included. In some embodiments, the liquid level may be at least one of a storage tank level or a pond level. The system may include an application configured to display information associated with the mobile monitoring system at a user's mobile device. The information may include at least one of the baseline site survey data, the liquid level, and one or more alarms triggered at the location. The information may be updated graphically in real-time. In some embodiments, the site survey data may be received from an autonomous drone. The system may be configured to generate, via the application, a three-dimensional map based upon, at least in part, the site survey data. In some embodiments, the mobile communications unit may be solar-powered. The mobile communications unit may be configured to transmit information to a central command center. The system may be configured to allow, via the application, a visual comparison of the baseline site survey data with real-time updated data.

In another implementation, a mobile monitoring method is provided. The method may include providing a mobile communications unit and detecting geographic data and liquid level data from a plurality of global positioning system "GPS" enabled sensors. The method may further include wirelessly transmitting the geographic data, liquid level data, and gas sensing data from the plurality of global positioning system "GPS" enabled sensors to the mobile communications unit. The method may also include storing a location associated with the mobile communication unit at a database, the database further configured to receive the geographic data and liquid level data from the plurality of GPS enabled sensors, the database also configured to store baseline site survey data corresponding to the locations associated with the mobile communications unit.

One or more of the following features may be included. The liquid level may be at least one of a storage tank level or a pond level. The method may further include displaying information associated with the mobile monitoring system at an application at a user's mobile device. The information may include at least one of the baseline site survey data, the liquid level, and one or more alarms triggered at the location. The method may also include graphically updating the information in real-time. The method may further include receiving the baseline site survey data from an autonomous drone. The method may also include generating, via the application, a three-dimensional map based upon, at least in part, the site survey data. The mobile communications unit may be solar-powered. The method may further include transmitting information from the mobile communications unit to a central command center. The method may also include allowing, via the application, a visual comparison of the baseline site survey data with real-time updated data.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE EMBODIMENTS

Figure 1:
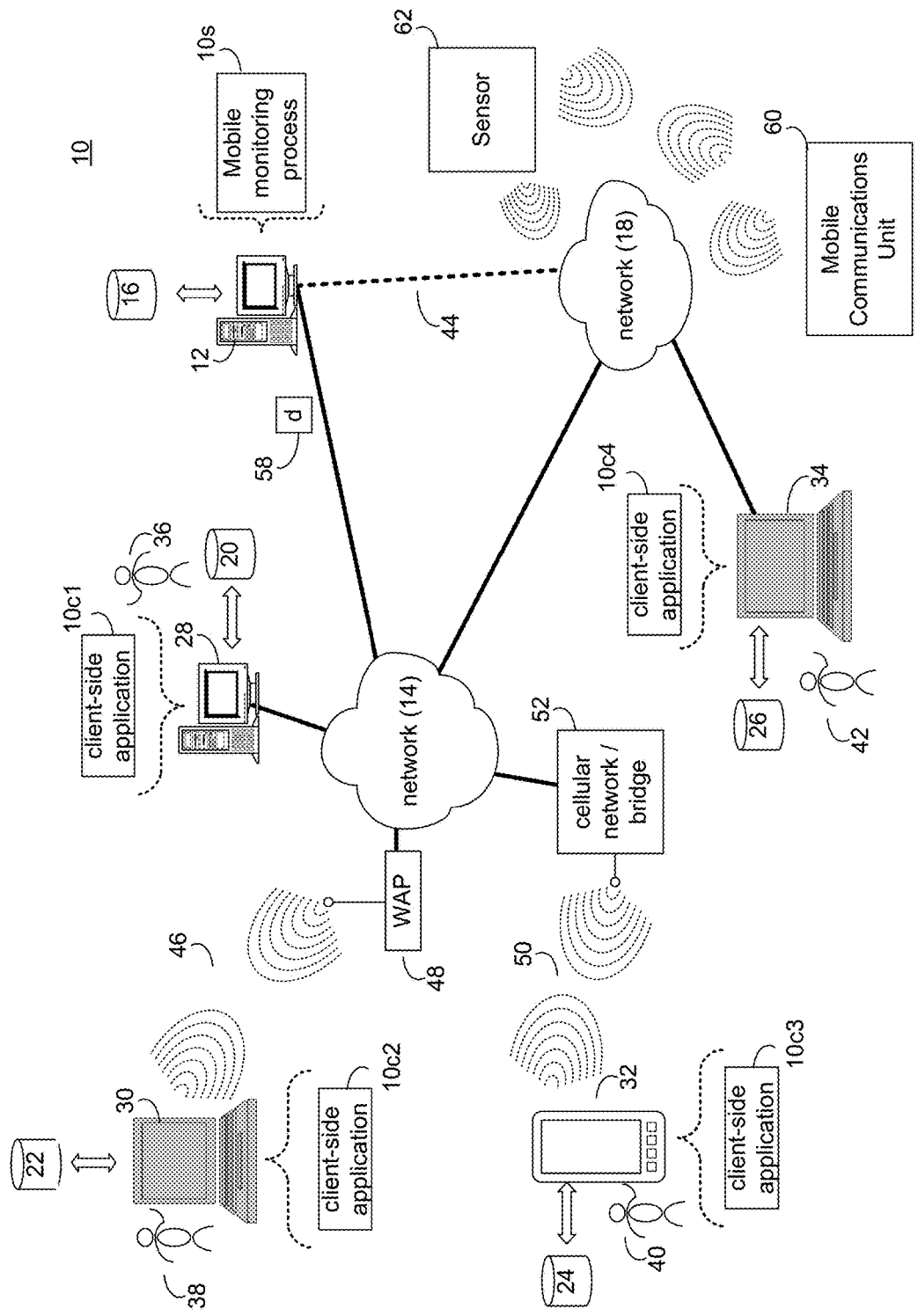
FIG. 1 is a diagrammatic view of a distributed computing network including one or more devices, units, sensors and/or processors that may execute a mobile monitoring process according to an embodiment of the present disclosure.

Referring to FIG. 1, there is shown mobile monitoring process 10. For the following discussion, it is intended to be understood that mobile monitoring process 10 may be implemented in a variety of ways. For example, mobile monitoring process 10 may be implemented as a server-side process, a client-side process, or a server-side/client-side process. Any user, if they so choose, may elect to disable any or all of the features associated with mobile monitoring process 10.

For example, mobile monitoring process 10 may be implemented as a purely server-side process via mobile monitoring process 10s. Alternatively, mobile monitoring process 10 may be implemented as a purely client-side process via one or more of client-side application 10c1, client-side application 10c2, client-side application 10c3, and client-side application 10c4. Alternatively still, mobile monitoring process 10 may be implemented as a server-side/client-side process via mobile monitoring process 10s in combination with one or more of client-side application 10c1, client-side application 10c2, client-side application 10c3, and client-side application 10c4.

Accordingly, mobile monitoring process 10 as used in this disclosure may include any combination of mobile monitoring process 10s, client-side application 10c1, client-side application 10c2, client-side application 10c3, and client-side application 10c4.

Figure 2:
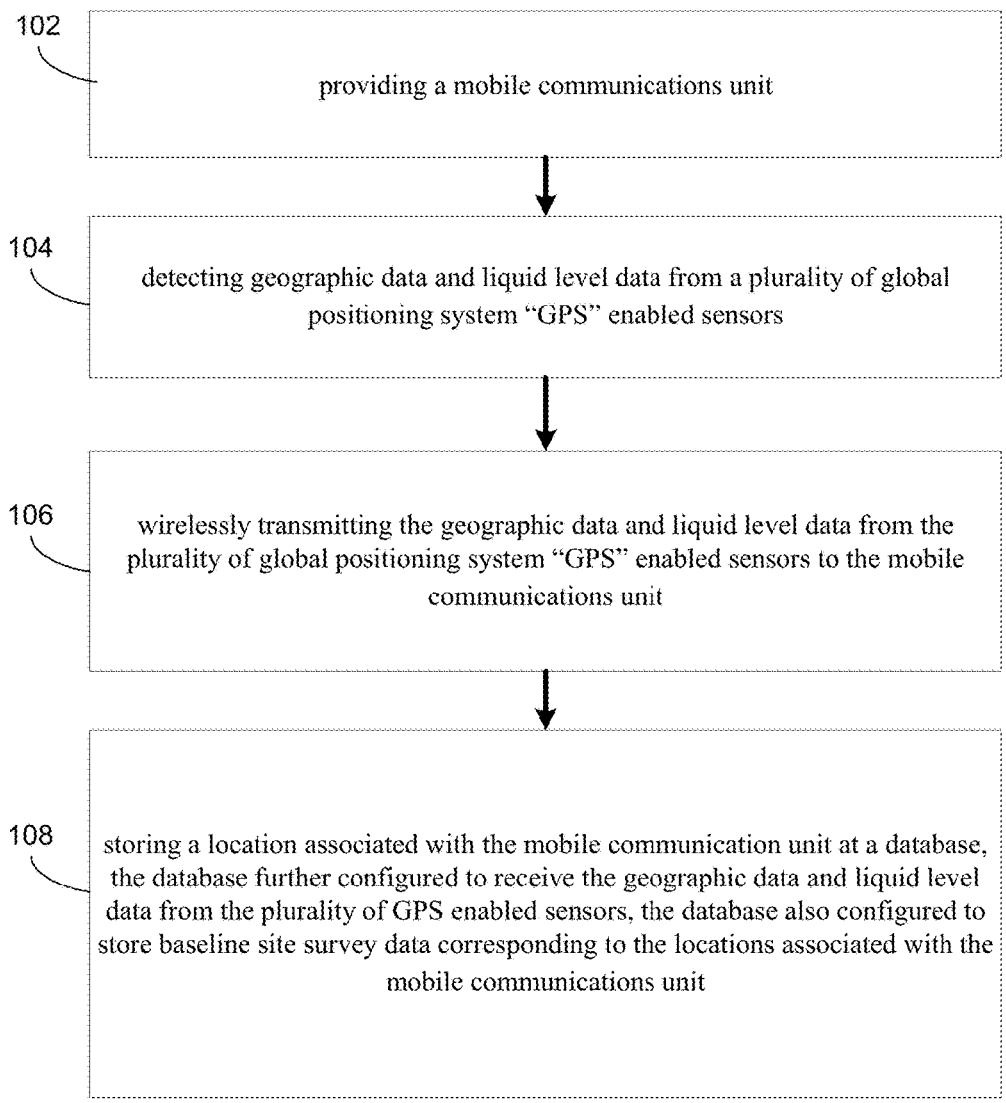
FIG. 2 is a flowchart of mobile monitoring process of FIG. 1 according to an embodiment of the present disclosure.

Referring also to FIG. 2 and as will be discussed below in greater detail, a mobile monitoring process 10 is shown. In some embodiments, the mobile monitoring process 10 may include providing (102) a mobile communications unit and detecting (104) geographic data, liquid level data, and gas sensing data from a plurality of global positioning system "GPS" enabled sensors. The mobile monitoring process 10 may be configured to wirelessly transmit (106) the geographic data and liquid level data from the plurality of global positioning system "GPS" enabled sensors to the mobile communications unit. The mobile monitoring process 10 may also be configured to store (108) a location associated with the mobile communication unit at a database, the database further configured to receive the geographic data and liquid level data from the plurality of GPS enabled sensors, the database also configured to store baseline site survey data corresponding to the locations associated with the mobile communications unit. Numerous other operations are also within the scope of the present disclosure as is discussed in further detail hereinbelow.

Mobile monitoring process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of mobile monitoring process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network, satellite data network; or an intranet, for example.

Examples of client-side applications 10c1, 10c2, 10c3, 10c4 may include but are not limited to a web browser, a game console user interface, a television user interface, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, desktop computer 28, laptop computer 30, data-enabled, cellular telephone 32, notebook computer 34, a server computer (not shown), a personal gaming device (not shown), a data-enabled television console (not shown), a personal music player (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access mobile monitoring process 10 directly through network 14 or through secondary network 18. Further, mobile monitoring process 10 may be accessed through secondary network 18 via link line 44. Additionally and/or alternatively, access may be provided via a satellite communications network such as a Global Area Network.

The various client electronic devices (e.g., client electronic devices 28, 30, 32, 34) may be directly or indirectly coupled to network 14 (or network 18). For example, desktop computer 28 is shown directly coupled to network 14 via a hardwired network connection. Laptop computer 30 is shown wirelessly coupled to network 14 via wireless communication channel 46 established between laptop computer 30 (respectively) and wireless access point (i.e., WAP) 48, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Further, data-enabled, cellular telephone 32 is shown wirelessly coupled to network 14 via wireless communication channel 50 established between data-enabled, cellular telephone 32 and cellular network/bridge 52, which is shown directly coupled to network 14. Additionally, notebook computer 34 is shown directly coupled to network 18 via a hardwired network connection. In some embodiments, local WiFi may be used from the users to mobile communication unit 60 and then satellite data network to the WAN. In some cases connectivity may occur from the user's mobile device via local WiFi to the mobile communication unit 60 then to the cloud via the satellite network.

Figure 5:
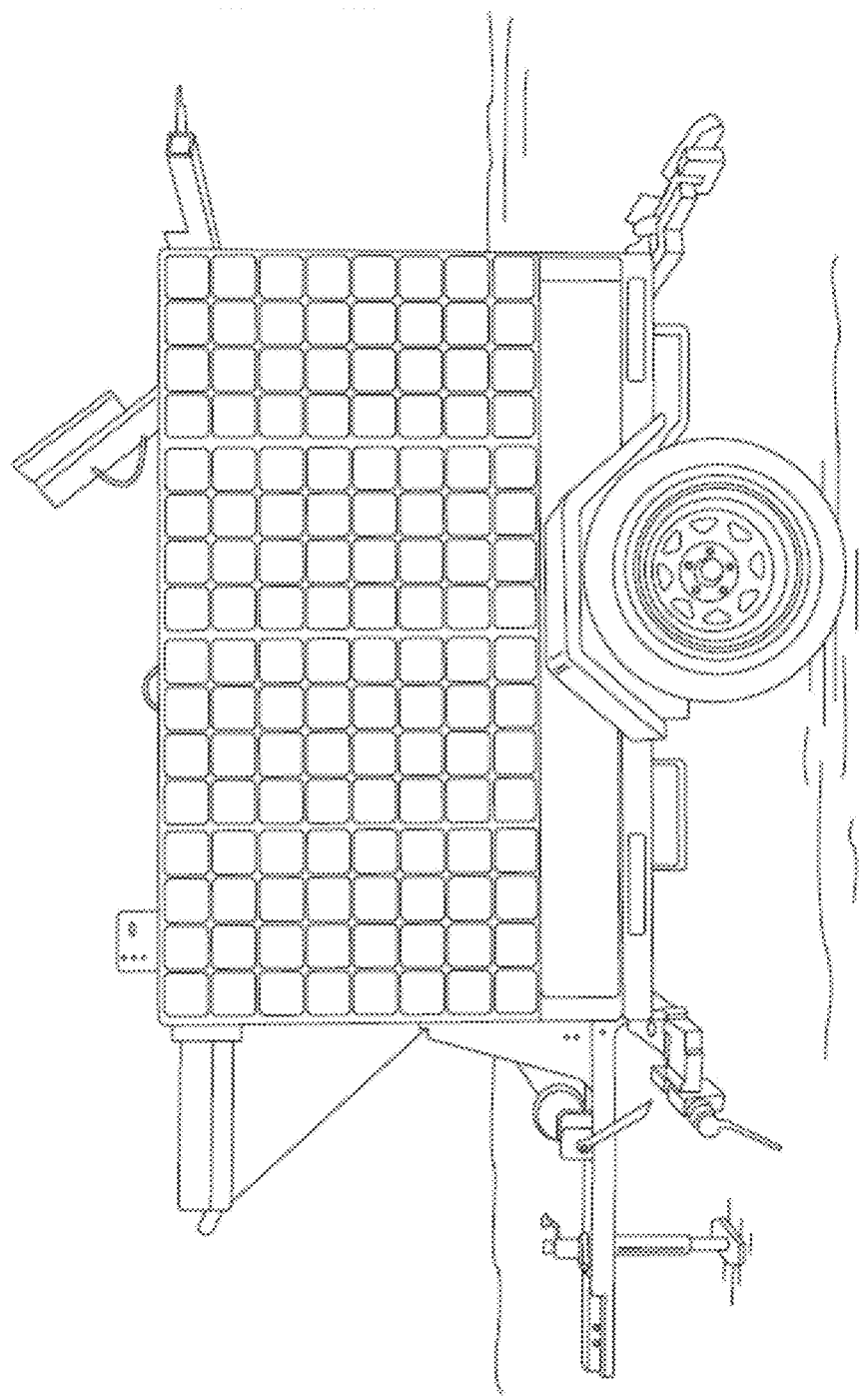
FIG. 5 is a diagrammatic view of a mobile monitoring process according to an embodiment of the present disclosure.

In some embodiments, and as shown in FIGS. 1 and 5, systems and methods of the mobile monitoring process 10 described herein may include one or more mobile communications units 60. Some or all of the functionality described in embodiments herein may be included within mobile communication unit 60. For example, mobile communication unit 60 may transmit one or more signals wirelessly to any part of a network such as network 14, 18, etc. The mobile communication unit 60 is described in further detail hereinbelow (e.g. with reference to FIG. 5, etc.).

Referring now to FIGS. 3-6 embodiments consistent with the mobile monitoring and system are provided. In some embodiments, the mobile monitoring system described herein has robust capabilities that address challenges that other monitoring systems face. Some of these may include, but are not limited to, surveying of tanks and/or ponds as part of a three-dimensional mapping (e.g., mapping of pond dimensions, etc.), the monitoring and reporting of the status of equipment and containment vessels, etc. Embodiments of the present disclosure may be configured to accurately measure vessels of any size or shape including organic, naturally occurring ponds.

Figure 3:
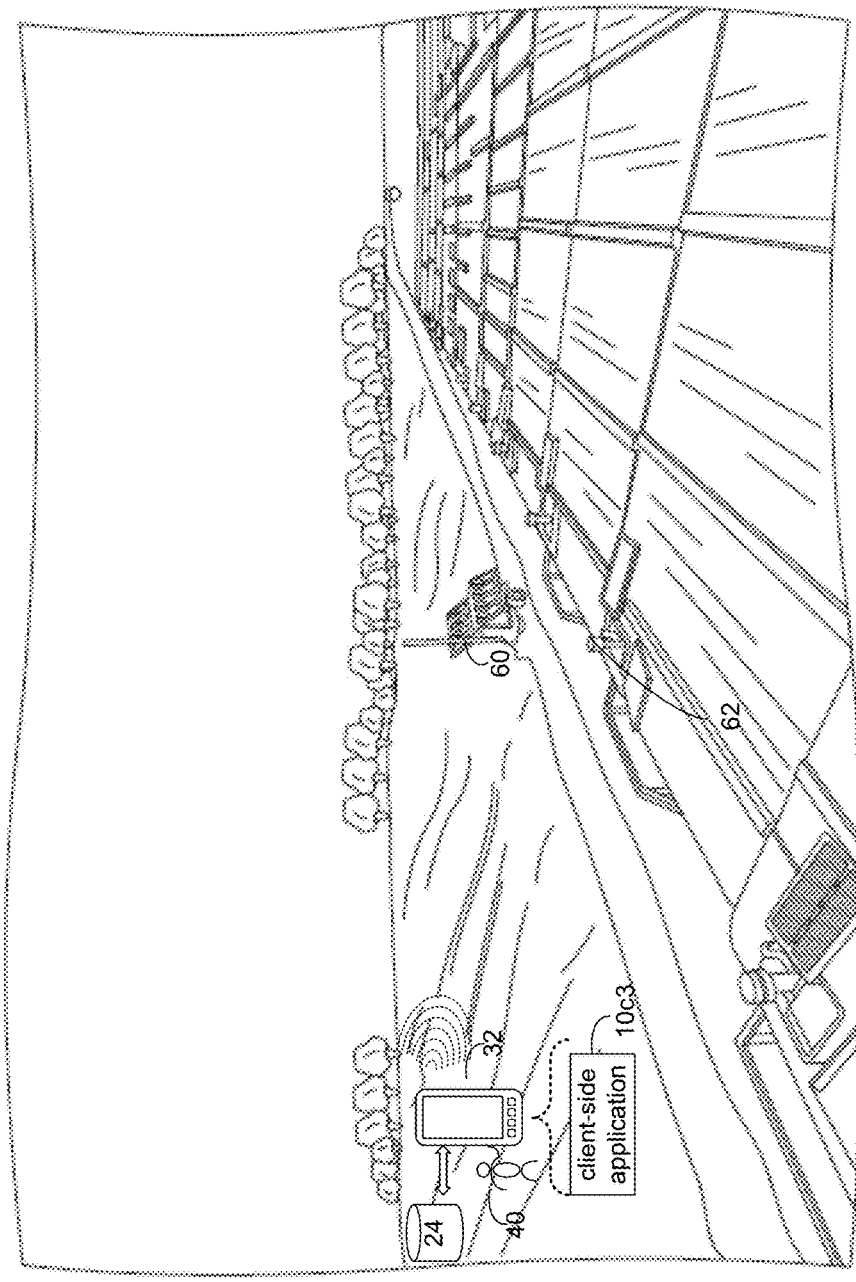
FIG. 3 is a diagrammatic view of a mobile monitoring process according to an embodiment of the present disclosure.
Figure 4:
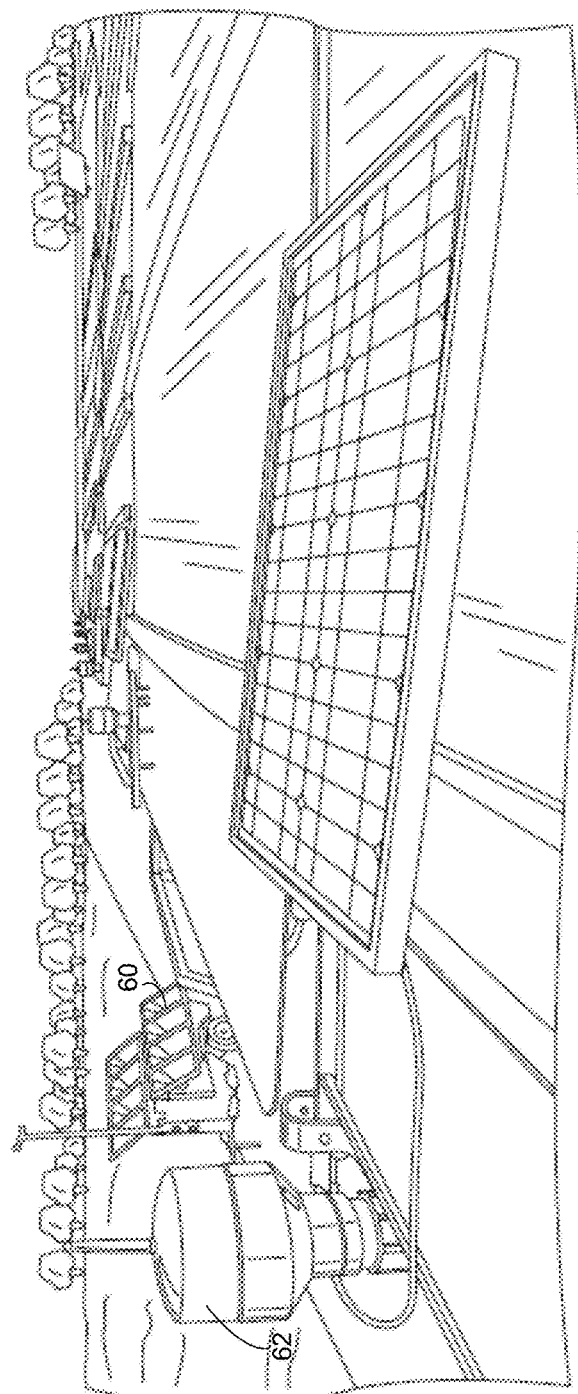
FIG. 4 is a diagrammatic view of a mobile monitoring process according to an embodiment of the present disclosure.

Referring to FIGS. 3-4, embodiments of a system consistent with mobile monitoring process 10 are provided. In this particular embodiment a mobile communication unit 60 is shown, which may be in communication with one or more storage tanks each having at least one sensor associated therewith. The operability of the sensors and mobile communications units are described in further detail hereinbelow.

In some embodiments, mobile monitoring process 10 may include one or more databases that may be available 24 hours a day, 7 days a week, in real-time. Additionally and/or alternatively, the functionality of the applications may be accessed using any suitable device, including, but not limited to, those shown in FIG. 1. For example, the mobile monitoring process 10 described herein may be available on any device connected to the internet in addition to any local on-site server.

In some embodiments, mobile monitoring process 10 may include performing a baseline survey. Accordingly, each project may begin with an in-depth analysis of a pond, tank, or other storage mechanism. For example, unmanned, autonomous vessels and/or drones may be deployed (e.g., lidar enabled drones, etc.) that may be configured to use GPS positioning, sonar depth sounding, and/or other suitable techniques for analysis. Using a vessel or drone may result in more accurate results and may help to prevent the human error factor. In this way, the initial survey may be used to obtain accurate and precise information of the size, current water level and high-water level of the pond, reservoir, tank, etc.

In some embodiments, this information may be transmitted using any suitable technique (e.g., Wi-Fi) and uploaded to one of our specialized technicians at a command center (e.g. associated with server computing device 12) who may then convert some or all of this data in real time to a three-dimensional map. Once the data has been collected a three-dimensional image may be created. This may include utilizing the GPS coordinates and data to give each client pertinent information of what the pond looks like. Access permissions may be set and as a result all authorized personnel may be able to access this information via the network.

Accordingly, embodiments of mobile monitoring process 10 may provide numerous advantages over existing approaches. For example, the lead-time to provide accurate analysis may beat the competitions average of a full week, by days, as embodiments included herein may accurately provide an analysis approximately two hours once the vessel and/or drone begins. Once the analysis has concluded, the sensor may be calibrated to the dimensions of the pond.

In some embodiments, mobile monitoring process 10 may allow a user to view a historical view of rates on that pond or site. This may all be user-selectable and displayed at any of the devices shown in FIG. 1. This allows for efficient real-time retrieval of site information upon accessing the website and entering a login that may be set by the user.

In some embodiments, mobile monitoring process 10 may include a plurality of sensors (e.g. sensor 62 shown in FIGS. 3-4) that may be configured to measure and monitor water levels and various other types of data. This information may all be transmitted wirelessly. The on/off switch may activate when the sensor is installed and uninstalled from the equipment. This may allow full automation, on/off activation and reduces the costly issue of potential theft by alarming the user via phone, tablet, and/or computer, that the sensor has been tampered with and/or removed. In some cases, the on/off switch may not turn the GPS off, as such, mobile monitoring process 10 may consistently track the sensor even if the sensor is not activated in the on position. It should be noted that each sensor may be adaptable to any tank or reservoir and the wireless sensors may transmit accurate up to the second measurements of depth, temperature, and various other metrics for a virtually unlimited number of tanks. The sensors may be solar powered wireless sensors, which may be easily deployed within minutes.

In some embodiments, GPS capabilities may be built into every sensor, allowing the user to have real-time tracking of the sensor and the equipment that is attached. Additionally and/or alternatively, mobile monitoring process 10 may be configured to enable communication with the command center via RFI, allowing a reduction of multiple satellite subscription fees, for example, down to one subscription. In some embodiments, each sensor may be completely wireless except for the charging cord that may be attached to AC or DC. Further, each sensor may come with a self-contained solar panel to charge the internal batteries that may be installed permanently or temporarily with a magnetic strip on the back.

In some embodiments, the sensors of the present disclosure are not limited to water. Some other applications may include, but are not limited to, salt water disposals, oil tanks, chemical tanks, and asset management and may be used to reduce overhead of driving routes to check on tanks for leaks or fluid levels. Embodiments of the present disclosure may also provide users with the ability to establish triggered alarms that may notify a specific user/supervisor when a level reaches a pre-established level. In this way, each alarm may notify a pre-established user by SMS and/or email of the alarm triggered, provide the exact location of the event, and identify the specific tank triggering the alarm. This may allow the client side user with the ability to assess the response necessary. Additionally and/or alternatively, this may allow companies to manage future stock needed and limit theft or "ghost" refills when employees report a container needs to be refilled but really doesn't and then sells the product to another party for personal financial gain.

In some embodiments, the sensors of the present disclosure may include a magnetic sensor on the bottom where it may be affixed (e.g., screwed into the container, etc.). Each sensor may include built in security measures that trigger an alarm if the sensor detects movement of a quarter turn or more. Should someone attempt to tamper or remove the sensor an alarm may be triggered, a supervisor may be notified by SMS and emailed of the situation. These sensors used in conjunction with the GPS sensor may also provide a theft deterrent and/or help in the recovery of these assets should they be stolen.

In some embodiments, the sensors described herein may be used to monitor the water level in the water well itself by reading the volume from the headspace to the well bottom. GPS tracking will provide users the exact location of each water well being monitored. Accordingly, the consumer will have access to real time measurements of the water level between pump shutoff and pump running. Additionally and/or alternatively, embodiments included herein may provide state agencies with an accurate method of monitoring a large number of wells concurrently without increasing labor costs. In this way, the data provided will help state agencies and users the ability to immediately identify shortages caused by drought or over consumption so that emergency conservation orders can be issued. Mobile monitoring process 10 may also be used to provide state regulators with the ability to quickly identify users who violate consumption regulations employed during water shortages. A water flow meter can also be installed on line. For example, the State of Texas requires monthly and quarterly reports tracking consumption on any water well providing public service, however, the state cannot employ enough regulators to determine the accuracy of these reports and instead must rely on an honor system. The teachings of the present disclosure would allow the state to monitor the accuracy of consumption of both private users and legally defined public water systems. The automated system described herein would be capable of auto-populating data received from a monitored well on the required monthly/quarterly reports, then automatically file these reports timely.

In some embodiments, each sensor may be fully waterproof and chemical resistant. Each sensor may be constructed out of any suitable material. For example, using a plastic construction may allow the sensor to be used in the harshest conditions such as acids, oil, and rain soaked environments. In operation, the measurements may be taken from the top instead of the bottom of the tank, which may eliminate the inconsistency from barometric pressure and/or the need to periodically clean the sensor from dirt or debris. Measuring from the top, unlike the current method of measurement that is taken by an operator, may also eliminate the risk of injury and or death by a serious fall and or exposure to chemicals within tanks or ponds. Additionally and/or alternatively, the sensors may be universal for all applications and may not require dedicated sensors for "produced water" or acids. The sensors are not subject to cleaning long cords when removed from toxic applications. As discussed above, the set-up time may be completed within minutes. Current competitive systems require designs, project plans, on-site surveys, and permanent fixtures such as power and concrete pads. The sensors of the present disclosure may transmit any suitable data. Some data types may include, but are not limited to geographic data, liquid level data, gas sensing data, flow rate, flow totalizer, and any other value collected from electrically measurable sensors and equipment.

In some embodiments, mobile monitoring process 10 may include one or more databases that may be configured to store various types of site related data. For example, each database may store the location of each job so that when the equipment/sensor is moved the server-side process may keep track during transport. As such, once it reaches the new location the database may locate the sensor/equipment and associate it with the new site. Accordingly, a fully automated inventory system may be created that may reduce the expense of manual labor and maintain accurate inventory record. The database (e.g. storage device 16) may allow a user to create any tank size by inputting dimensions of the tank whereby the tank may be quickly defined, building a catalog of different tanks for future use. The database or databases may be configured to generate real-time results (e.g., with data reporting as often as every 1-second) and stores all the data for just about any analytic needed. Additionally and/or alternatively, the database may provide the tank and the liquid levels graphically through a method of superimposing an image of the vessel with an image of the fluid level so the user can look at the display and quickly recognize the levels (or review the actual numerical display.

Embodiments of mobile monitoring process 10 may provide the user the ability to set alarms on any characteristic being monitored. Moreover, the user may set thresholds for the alarms, thus allowing the user to tailor notifications to their individual needs.

In some embodiments, mobile monitoring process 10 may provide a Wi-Fi connection on-site allowing even the most remote locations to access the database for that site without any lag in accessing the needed data in real-time. This also allows the user to access Wi-Fi on location from his/her own device to communicate not only with server-side process but also providing full web access and emailing capabilities (e.g., when cellular doesn't permit). Embodiments of the present disclosure may provide a fully automated water monitoring system that may be configured to measure water going in and out of the tanks/ponds. Embodiments may also be configured to report water consumption, evaporation, rainfall, and PH levels. In some embodiments, data may be securely communicated from a built in ground transceiver via a global satellite network to and from the server-side process private cloud. Additionally and/or alternatively, data may be transmitted locally via Wi-Fi to preconfigured ruggedized tables or any Wi-Fi enabled device.

In some embodiments, mobile monitoring process 10 may allow a user to input the water expected to be used for a particular job and then measure backwards so the user may see if the operator is accurately predicting water consumption, if more water is required or if a surplus is expected at the conclusion of the job. Additionally and/or alternatively, mobile monitoring process 10 may be configured to automatically turn on or off water pumps based on demand elsewhere in the system. The system may also track fuel use and sound an alarm if fuel has been stolen.

In some embodiments, mobile monitoring process 10 may include numerous different types of equipment that may be configured to provide run-time reports and to generate failure prediction and preventive maintenance schedules. Embodiments may further include monitoring pump RPM (revolutions per minute) and BPM (barrels per minute) data. The system may trigger an alarm if the battery is disconnected. The system may be configured to automatically shut off the power in certain circumstances (e.g., if the key is left on without running). Mobile monitoring process 10 may be configured to automatically generate a notification when maintenance is required. Additionally and/or alternatively, mobile monitoring process 10 may be configured to start, stop and control the speed of the pump engine to optimize water flow, etc. Mobile monitoring process 10 may enable automation of one or more manifold valves, which may allow water to flow into specified tanks and shut off when levels are reached. Mobile monitoring process 10 may be further configured to control generators, light towers and other motorized equipment in the oil field in a manner similar to the water pumps.

In some embodiments, mobile monitoring process 10 may also be configured to provide fire detection and automatic notifications to site operators and the local authorities. This notification may include, but is not limited to, GPS coordinates corresponding to the location, contact information for site contacts, etc. This provides first responders with the ability to reach the operator, if needed. This may reduce the risk of a complete site disaster, saving money, equipment and lives.

In some embodiments, mobile monitoring process 10 may be configured to provide enhanced communication capabilities that existing approaches do not provide. As such, mobile monitoring process 10 may be configured to deliver the first fully automated system for the water transfer sector of the oil industry. Embodiments disclosed herein may be used to construct a fully automated oil field as additional modules may be added due to our unique independently created system and not a production of numerous disparate providers. Accordingly, the mobile monitoring process 10 described herein may be used to create any application that a client requests.

Embodiments of mobile monitoring process 10 provide numerous advantages over existing approaches. For example, embodiments of the present disclosure allow for the generation and display, in real-time, of historical data, graphs, three-dimensional models and any other relevant data to a client's tank or pond is all available via the application (e.g., via one access point for all authorized users). Sorting through multiple emails to find the desired data is not required or necessary. FIGS. 10-14 depict examples of graphical user interfaces that may be configured to display aspects of mobile monitoring process 10.

Figure 6:
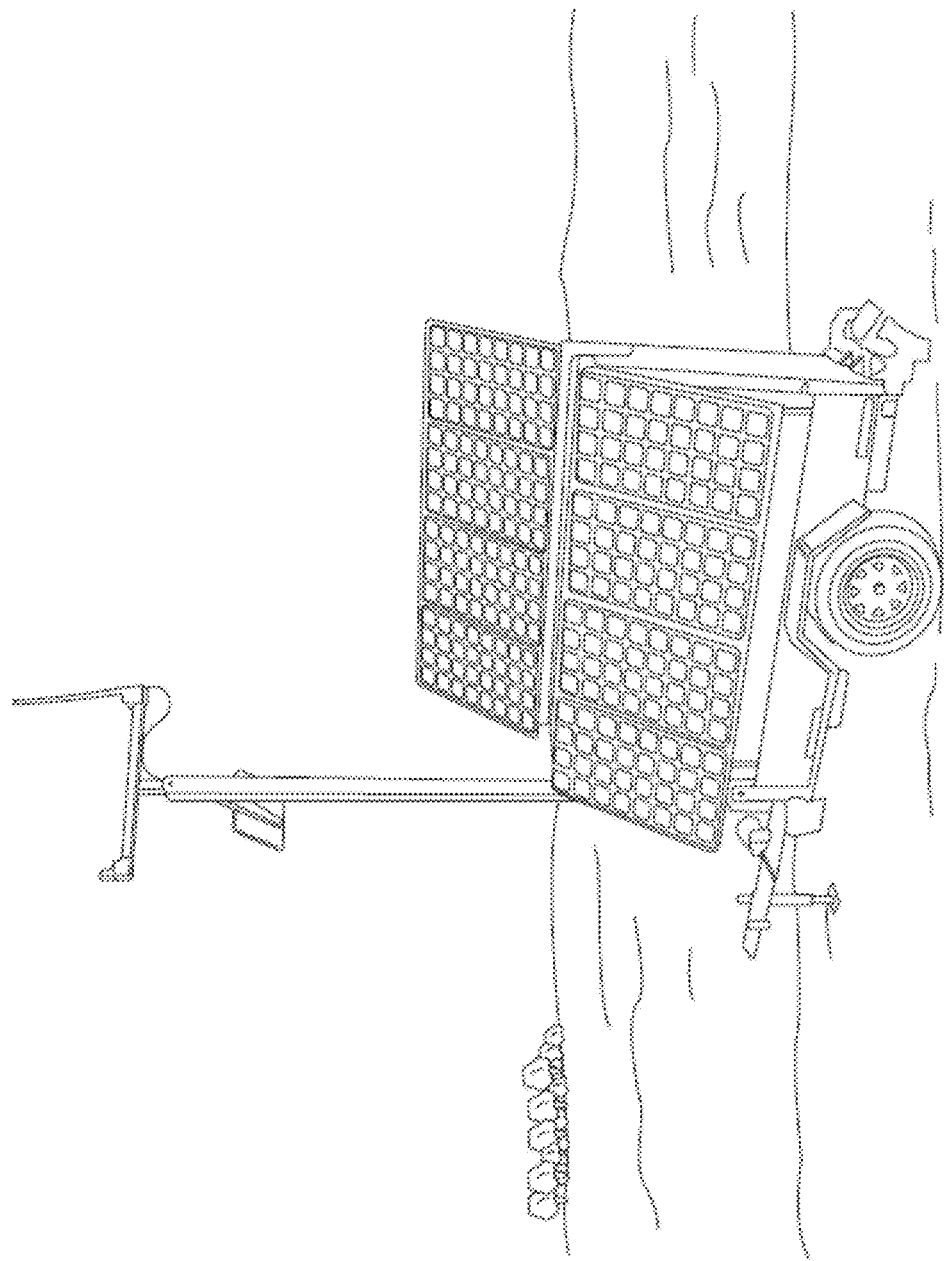
FIG. 6 is a diagrammatic view of a mobile monitoring process according to an embodiment of the present disclosure.
Figure 7:
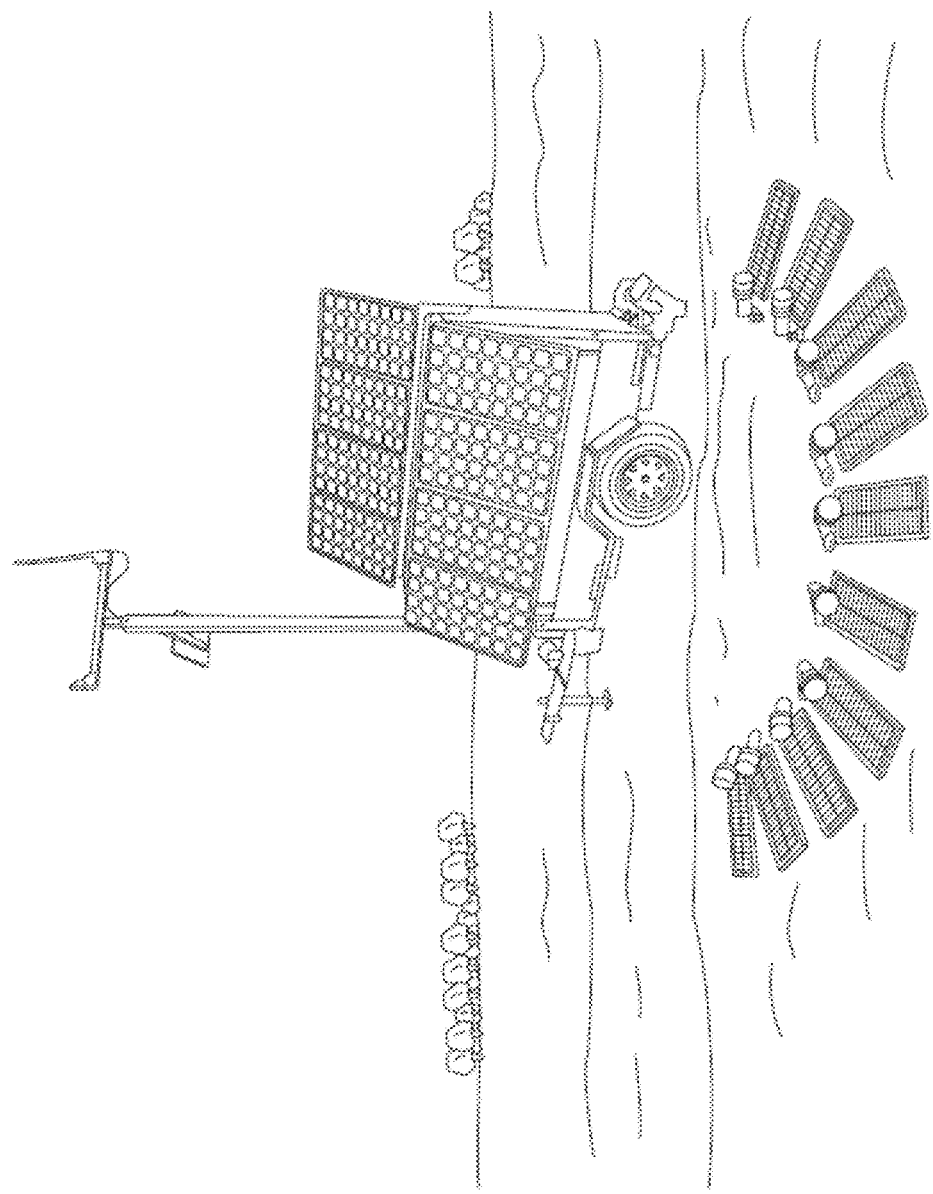
FIG. 7 is a diagrammatic view of a mobile monitoring process according to an embodiment of the present disclosure.

As discussed above, mobile monitoring process 10 may include one or more mobile communications units as shown in FIGS. 5-7. In some embodiments, the system may include a manifold trailer, which may be configured to incorporate the system's servers and communication gear therefore eliminating the need to transport multiple trailers. The manifold trailer may be located centrally to the site. In some embodiments, the mobile communications unit may include, in whole or in part, a solar powered stand-alone data center trailer, a skid mounted data center trailer for more permanent applications, and/or a mobile box to hardwire where there is already an office set up on location.

As discussed above, mobile monitoring process 10 may include one or more applications that may be accessible over a network as is depicted in FIG. 1. In some embodiments, the application may be downloaded to any mobile device for ease of use and does not require anyone associated with the server-side process to set the application up for the user. This is in stark contrast to any existing system. Additionally and/or alternatively, mobile monitoring process 10 may allow one or more external devices to be added to the system. Some of these may include, but are not limited to, cameras and lights that provide users with the ability to monitor their locations with video surveillance. Mobile monitoring process 10 may allow for the automated display of relevant data and warnings on a user's mobile device based on their proximity to a device or sensor. In some embodiments, the mobile device may be configured to automatically open the application and display the data properties of the closest sensor to the user.

In some embodiments, mobile monitoring process 10 may include gas sensing capabilities. Accordingly, the system may incorporate sensors for detecting potentially harmful gases and may include GPS location identification for where these gases are being detected. In operation, as each sample is taken (e.g., volume, pressure, flow rate, etc.) a sample of the surrounding atmosphere is taken. This sample may be analyzed electronically for the presence of potentially harmful gases including Chlorine Gas (Cl) and Hydrogen Sulfide (H2S). The level of gas detected and the GPS location at which the measurements (e.g., volume, pressure flow rate, gas levels) were taken may be returned to the system for storage and analysis. In some embodiments, and upon analysis, alarms may be triggered and transmitted automatically via electronic means to associated personnel.

In some embodiments, one or more applications associated with mobile monitoring process 10 may geographically plot on an interactive map, the location and levels of gases detected to aid emergency personnel and processes in securing the safety of the site and the personnel. The levels of gases detected and their location may be updated with new periodic samples as the system continues to monitor the site.

In some embodiments, the sampling of gas may utilize a separate chamber for each gas being measured. These chambers are within the sensor housing and may be filled with a fresh atmosphere sample by a vacuum pump (e.g., a miniature pump). Once enough air has been drawn in to ensure the chambers are adequately refreshed, the sensor for each chamber/gas sample may be activated heating the atmosphere inside and measuring changes chemical composition of the sample. Once the test is completed, the vacuum pump may again be activated briefly to expel the sample and clear the sensors.

In some embodiments, the H2S sensors may allow the location of gas on site to be narrowed down using a GPS location assistant and with the weather information built in, wind direction and speed will help determine a safe evacuation route.

In some embodiments, fire suppression system an H2S probe sensor that may be separate from the H2S sensors. This H2S probe sensor may be configured to monitor the H2S level in the pipelines as fluids are flowing. Alerts may be transmitted using any suitable approach. For example, similarly to the water sensors with H2S monitoring and the H2S air sensors.

Figure 8:
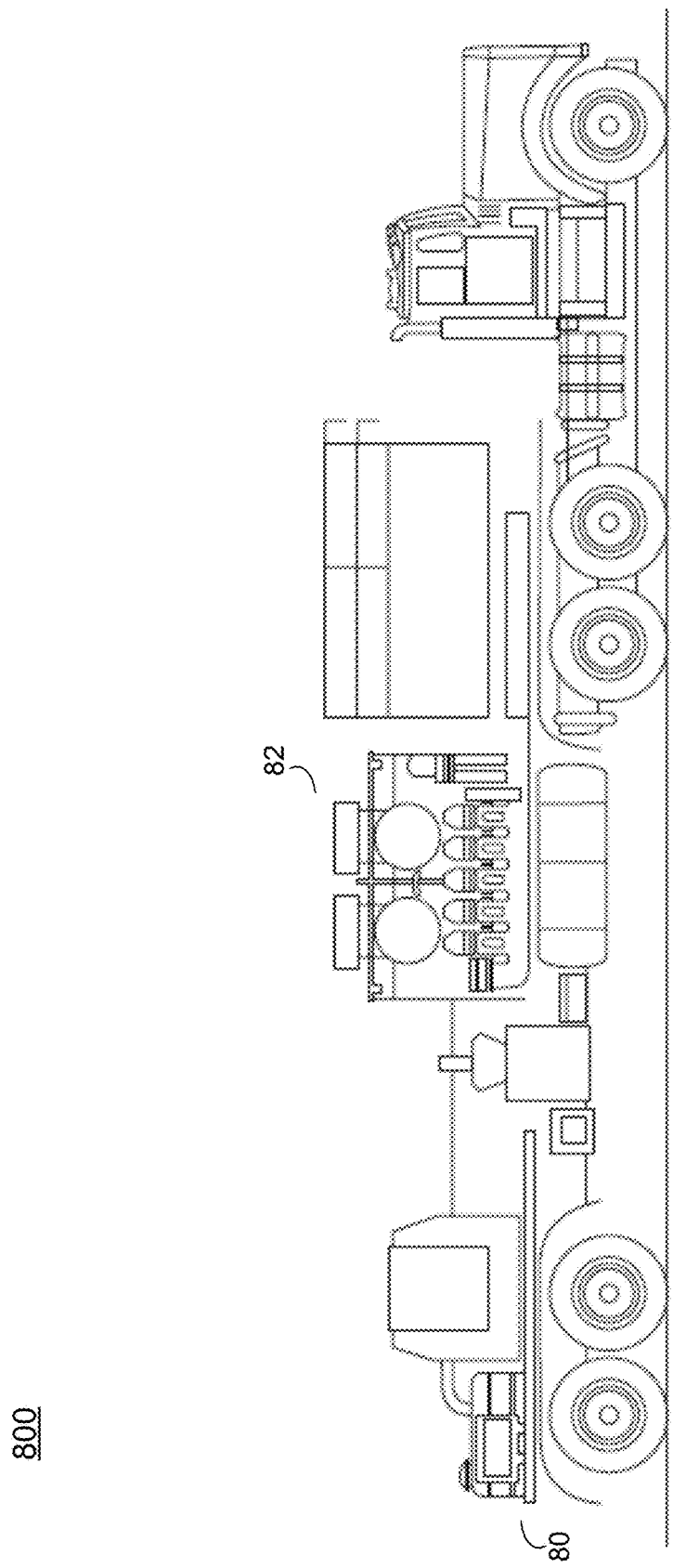
FIG. 8 is a diagrammatic view of a mobile monitoring process according to an embodiment of the present disclosure.

Referring now to FIG. 8, an embodiment consistent with mobile monitoring process 10 is provided. In this particular embodiment an engine fire suppression system is shown. In some embodiments, this system may allow for the transformation of equipment into a fire truck with the installation of a fire suppression system. The system may be equipped with 100 feet of fire hose, allowing adjacent trucks to assist in suppressing fires—essentially turning them into 500-gallon foam engines. The foam barrier deployed by the adjacent trucks may be used to prevent a fire from spreading laterally. The system may include an EFSS 80 module at the rear of the vehicle, which may allow for an external fire hose to be operated at a safe distance from a fire. The system may further include a compressed air foam system 82. This system may include one or more nozzles configured to emit a foam discharge to create a cool zone and extinguish fires.

Figure 9:
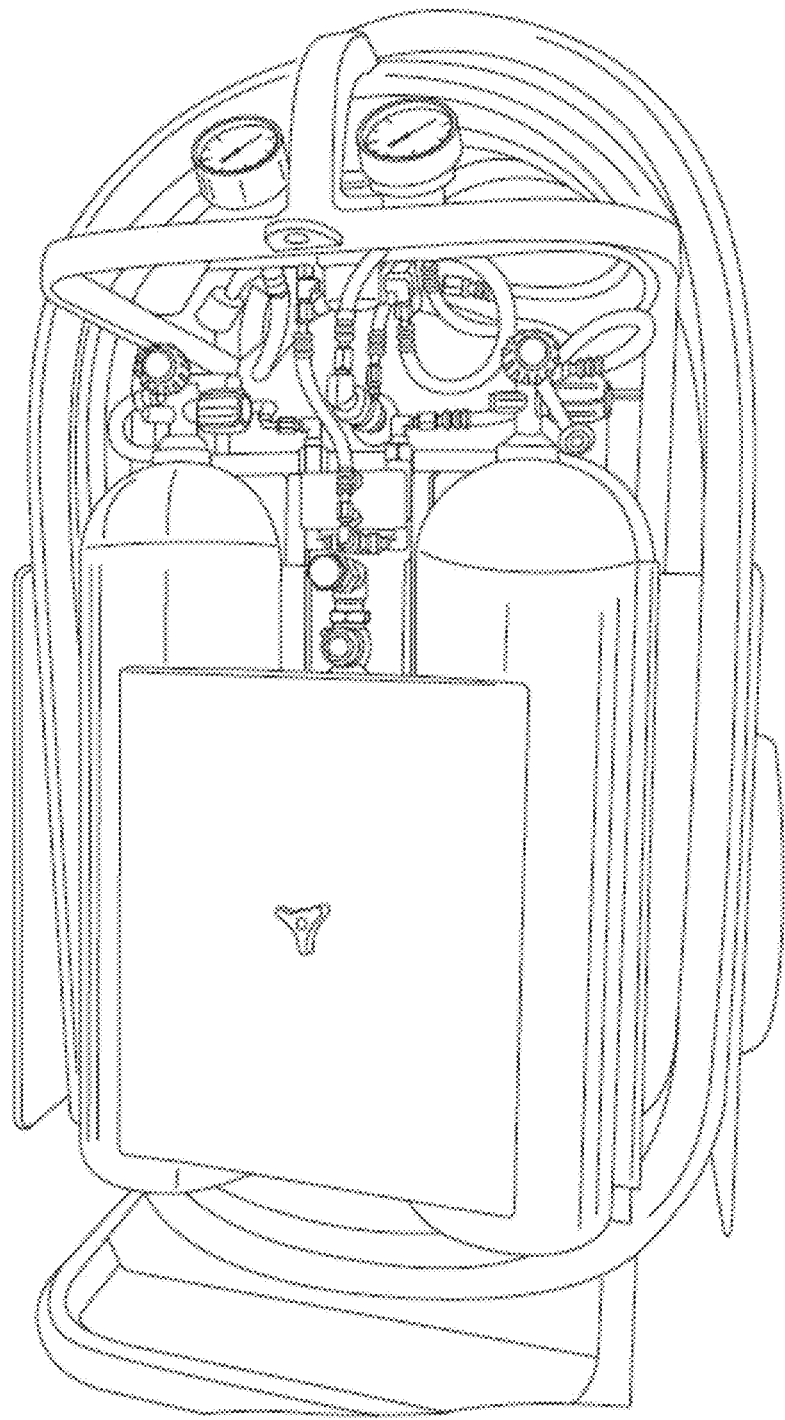
FIG. 9 is a diagrammatic view of a mobile monitoring process according to an embodiment of the present disclosure
Figure 10:
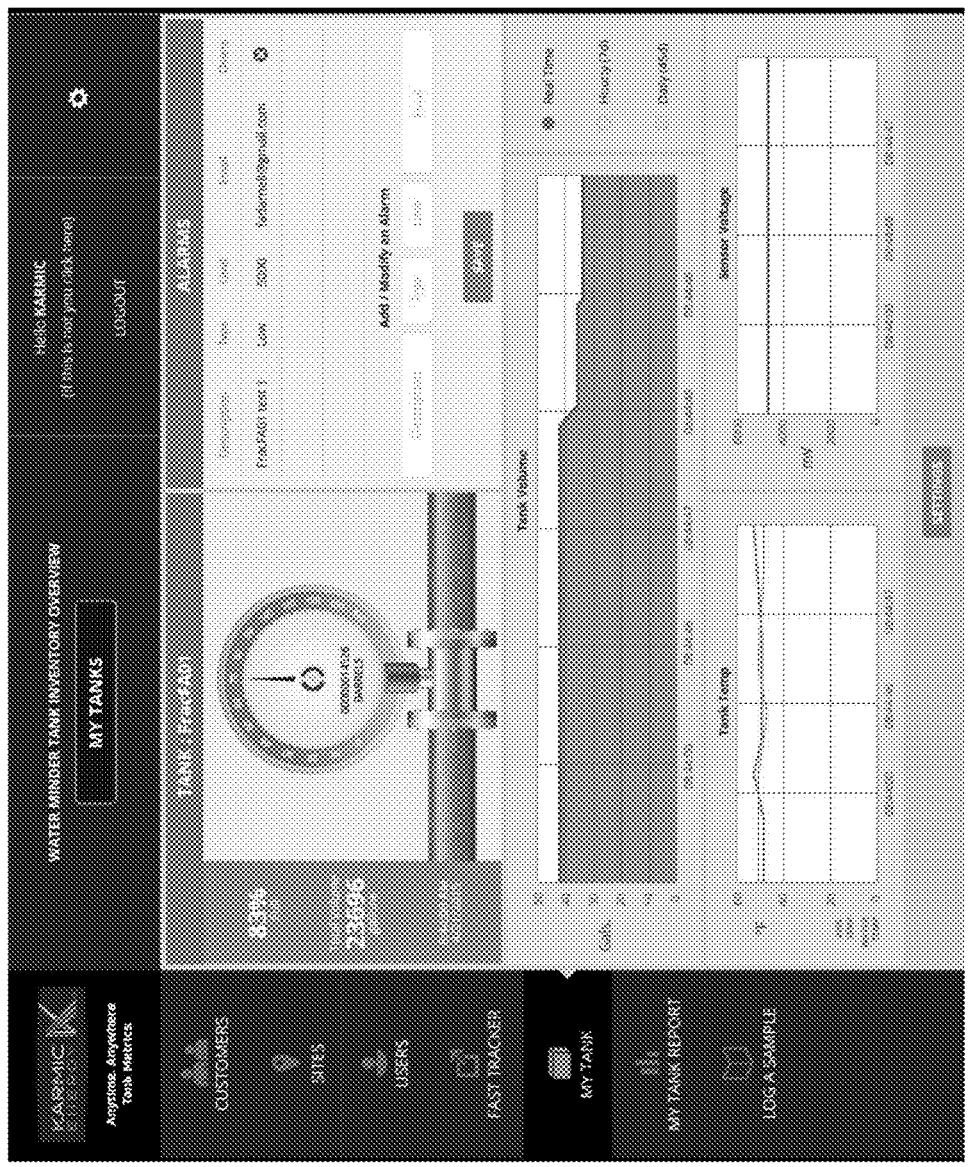
FIG. 10 is a diagrammatic view of a mobile monitoring process GUI according to an embodiment of the present disclosure.
Figure 11:
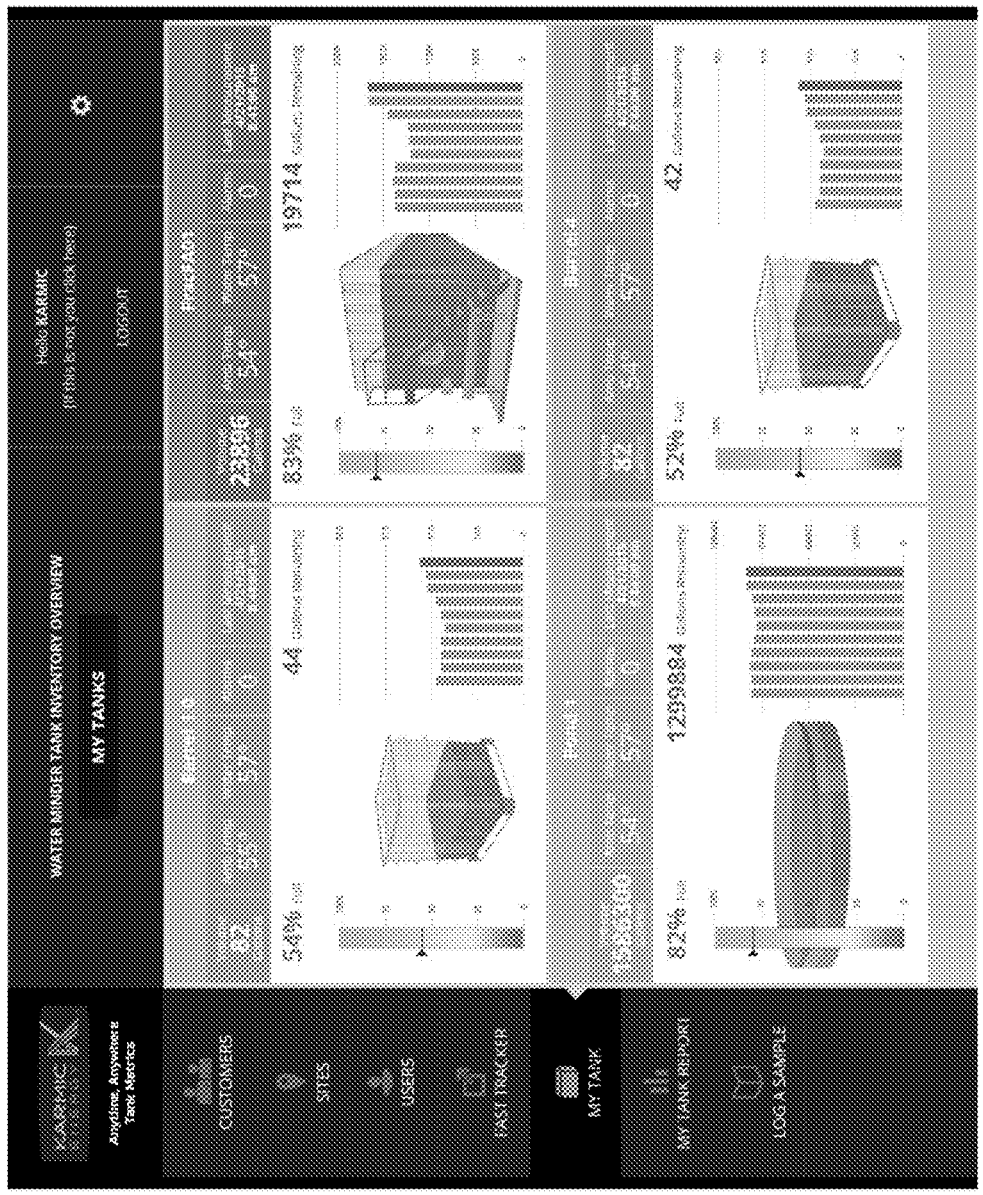
FIG. 11 is a diagrammatic view of a mobile monitoring process GUI according to an embodiment of the present disclosure.
Figure 12:
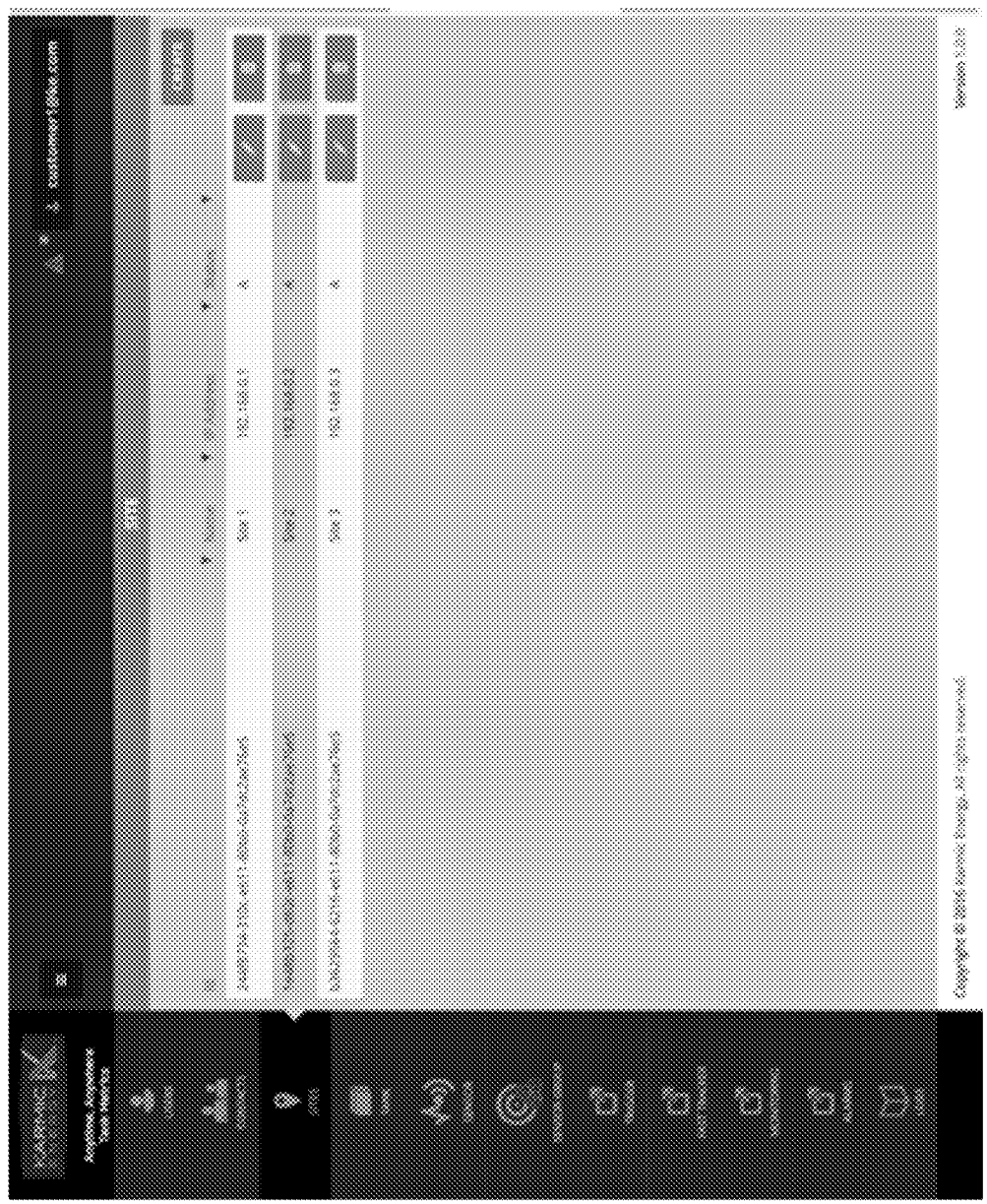
FIG. 12 is a diagrammatic view of a mobile monitoring process GUI according to an embodiment of the present disclosure.
Figure 13:
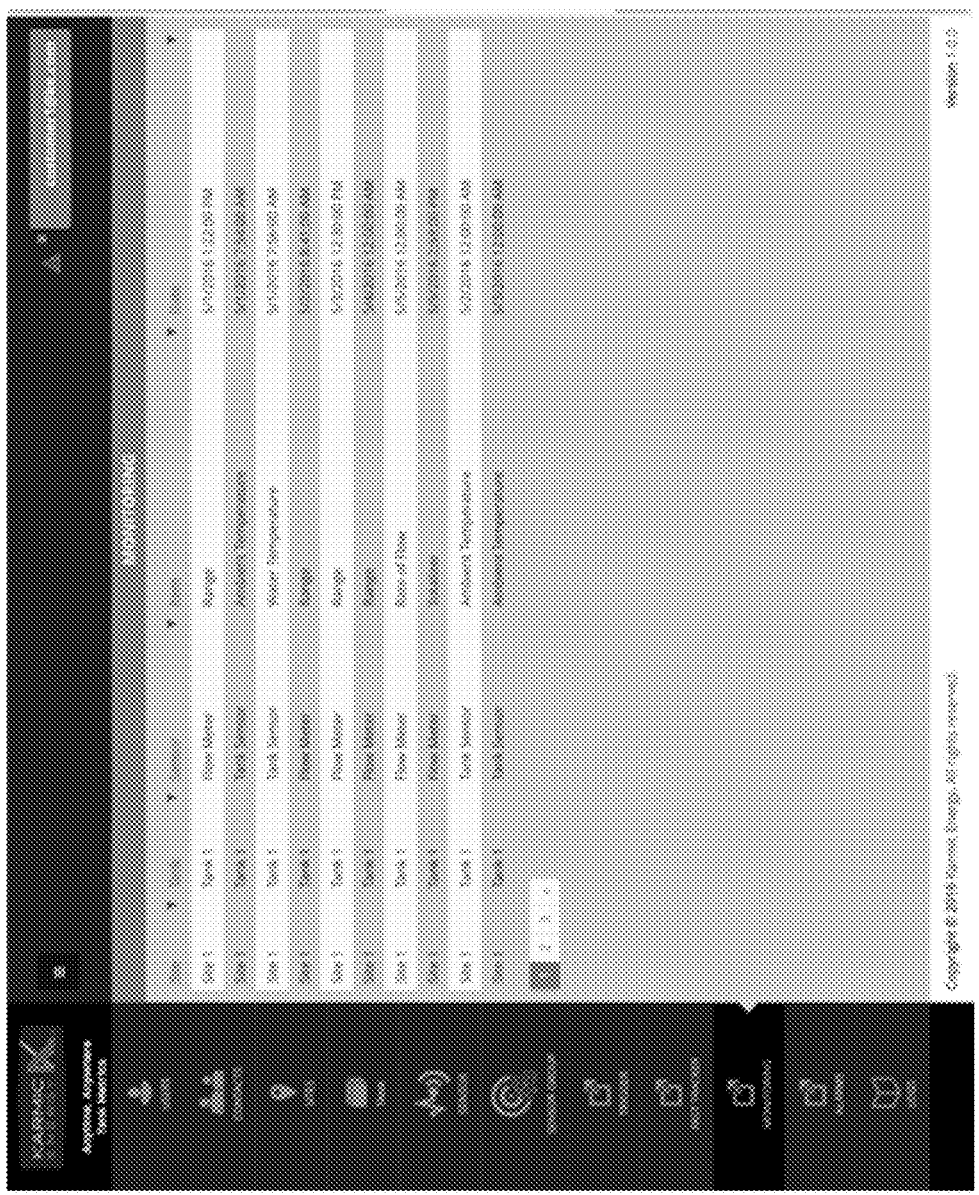
FIG. 13 is a diagrammatic view of a mobile monitoring process GUI according to an embodiment of the present disclosure.
Figure 14:
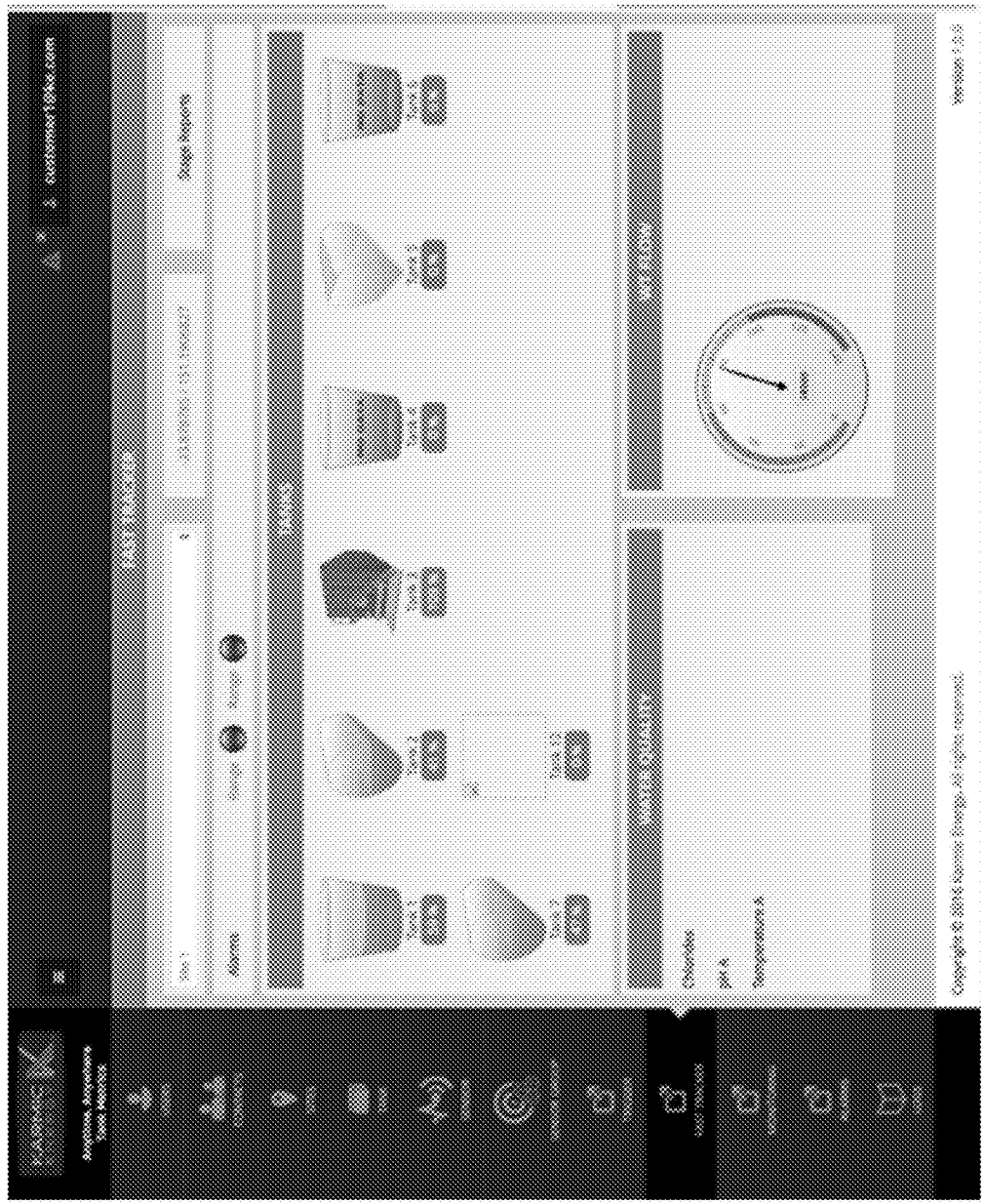
FIG. 14 is a diagrammatic view of a mobile monitoring process GUI according to an embodiment of the present disclosure.

As is shown in FIG. 8, in some embodiments the fire suppression system may be mounted on the rear of a frac pump trailer and fire nozzles, then strategically plumbed around the trailer, engine and hydraulic lines in a manner that offers full coverage of the entire vessel. When the infrared and/or fiber optics sensors detect a temperature that exceeds the pre-programmed limit the fire suppressing foaming agent may be automatically dispersed and the system may automatically contact 911/EMS and the operator on duty. The system may be configured to provide EMS both the GPS location and the detailed driving instructions that are uploaded into the application at time of initial site set-up. This will reduce the loss of lives, assets, time, insurance premiums, environmental impact, property damage, and injuries. Due to the rural and remote locations often involved with these sites cell phone service and 911 access may be limited and driving directions may be difficult, which may cost hours of critical time. FIG. 9 depicts an example of the fire suppressant system if the wheels and tongue were removed. This unit may then be mounted on the frac trailer and the plumbing for the nozzles would be installed.

In some embodiments, the fire suppression system may be configured to utilize fiber-optic lines that may identify and trigger the system to disperse fire suppressing compressed air foam throughout the entire frac pump trailer. Additionally and/or alternatively, the system may employ a built in GPS system that automatically contacts 911, provides them with the type of alarm along with the exact location of the fire.

In some embodiments, mobile monitoring process 10 may include a 911 button that may be accessed on all mobile and computer devices that are linked to the application and/or server-side process. Accordingly, a user may contact EMS even where cellular service in unavailable. This service offers the same GPS and driving directions automatically to 911 dispatch as the fire suppressant automation provides. Additionally and/or alternatively the associated application may be configured to provide users with a 911 emergency activation button within its service application that provides users with the ability to automatically contact 911 using a satellite/Wi-Fi service platform. Once activated this service may also provide dispatch with the exact location of the user requesting emergency services, while also detailing the previously uploaded driving instructions entered at the time site was established.

Figure 15:
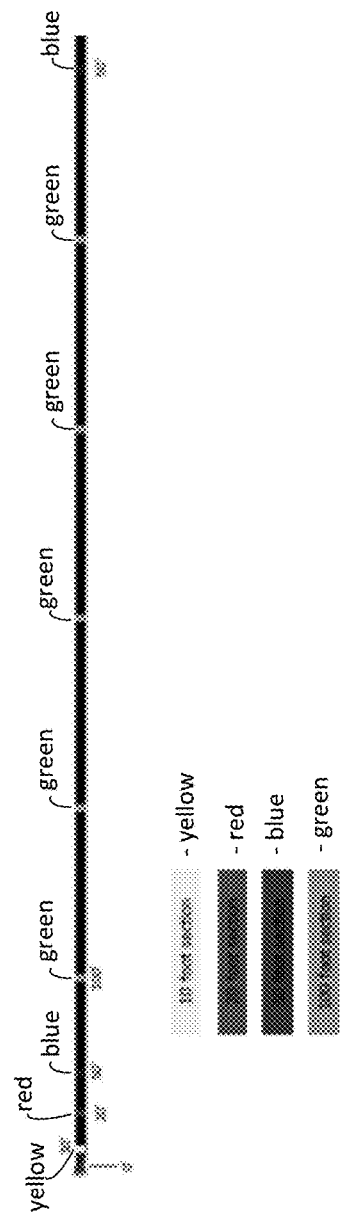
FIG. 15 is a diagrammatic view of a mobile monitoring process according to an embodiment of the present disclosure.

In some embodiments, and referring to FIG. 15, mobile monitoring process 10 may include lay flat hose that may be used to transport the water from pit/pond to frac tanks. For example, these hoses may be 660' long and vary from 8", 10", and 12". One of the hardest assets to track in the industry is lay flat hose because existing systems were unable to be tracked. Accordingly, embodiments of mobile monitoring process 10 may incorporate micro GPS devices randomly on the hose and the bands that adhere to the hose are not only color coded for length determination but to discretely secure the Micro GPS transmitter. Typically, when hose is deployed it requires 7 miles of hose on average, this is a huge liability if it is stolen and resold. Another problem is if the hoses are rented a user must measure each 660' section before and after the use to make sure it hasn't been altered or shortened. Embodiments of mobile monitoring process 10 may incorporate color coded bands that are 1 ft wide and securely adhere to the polyurethane hose as discussed below. For example, yellow band may be placed 10' from each end of hose, red band may be placed 20' from each end, blue hose may be placed 50' from each end, green bands may be placed 100' from each end, etc. Numerous other approaches may also be used.

Figure 16:
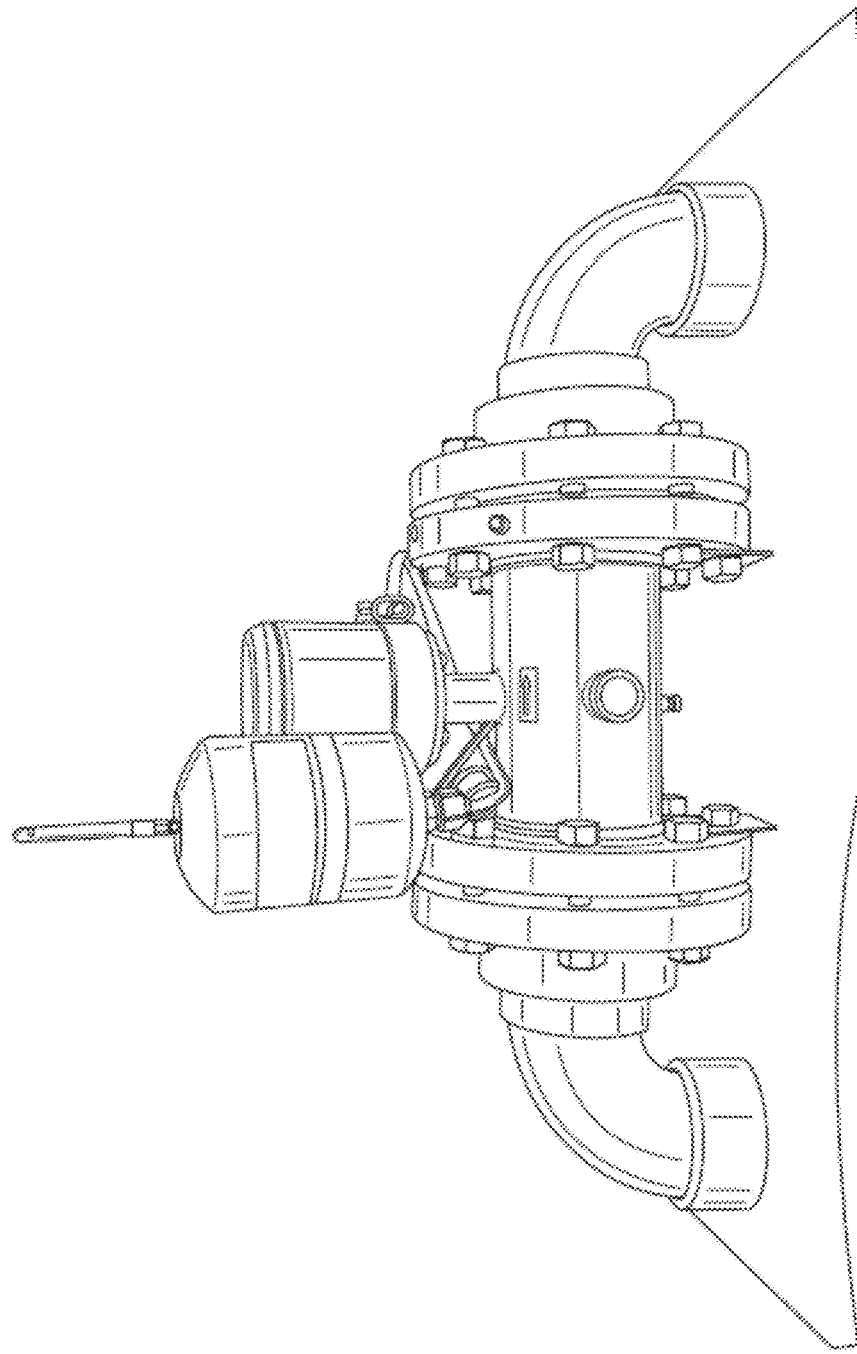
FIG. 16 is a diagrammatic view of a mobile monitoring process according to an embodiment of the present disclosure.
Figure 17:
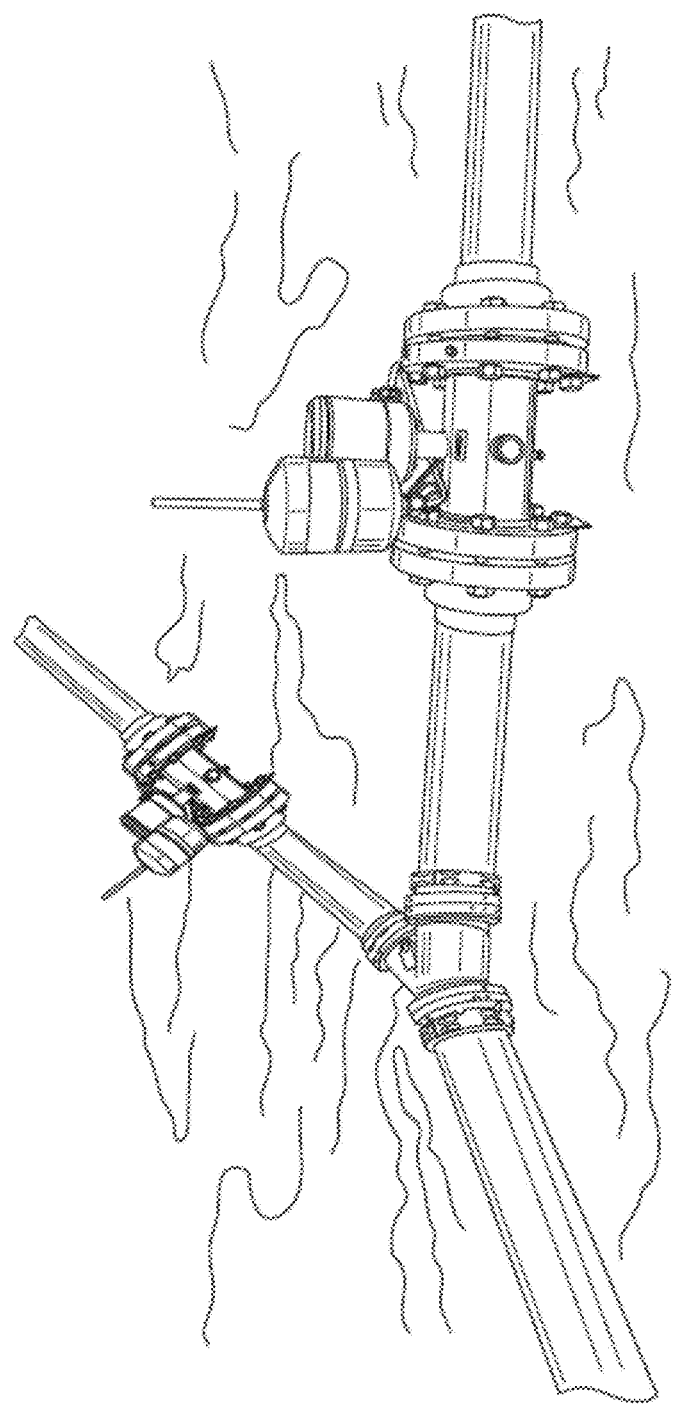
FIG. 17 is a diagrammatic view of a mobile monitoring process according to an embodiment of the present disclosure.
Figure 18:
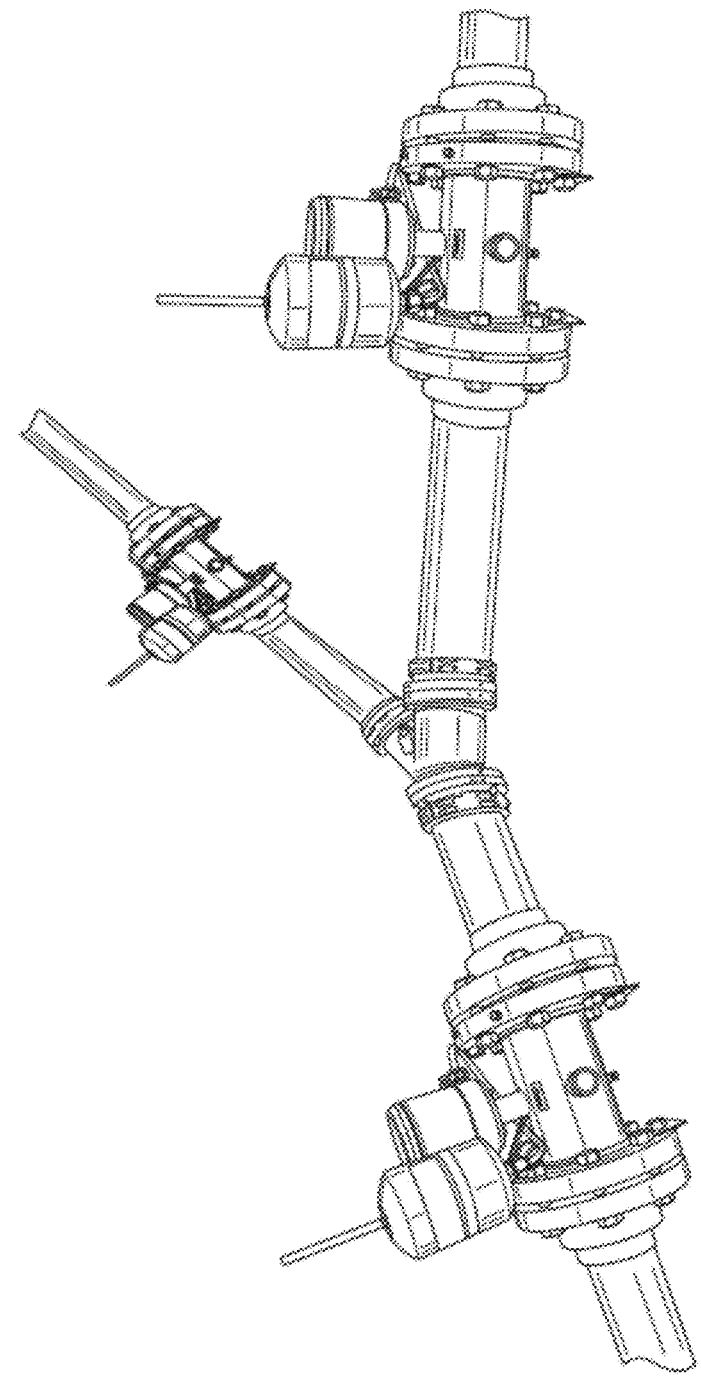
FIG. 18 is a diagrammatic view of a mobile monitoring process according to an embodiment of the present disclosure.

In some embodiments, and referring to FIGS. 16-18, mobile monitoring process 10 may include one or more flow meters having an automation sensor configured to provide a real-time and accurate water or fluid count. FIG. 16 depicts a flow meter having a monitoring sensor affixed thereto. In operation, each flow meter may determine forward and backward volume and provide a net volume consumption that no other flow meter currently offers on the market. Additionally and/or alternatively, the flow meters of the present disclosure may be configured to provide an accurate blend ration if two or more flow meters are in use side by side with percentage of produced water to fresh water blended. The sensors described herein may accurately automate water consumption reports for well owners, oil companies, state, and/or federal regulatory agencies that require water reporting. This will ensure accountability, through the use of a cost efficient, accurate water monitoring device. Users with flow meters may be able to identify contaminants in the water in real-time, rather than seeking offsite testing services that must test samples provided or retrieved from the water source. Accordingly, the sensors described herein may be configured to identify these contaminants within the flow meter itself, therefore providing the user with an accurate level of any identified contaminants. In operation, if more than one liquid is being blended together the system may include two or more flow meters so the blend ratio can be calculated (e.g., between fresh and produced water or other liquids). If only one liquid and one source are involved the "Y" configuration of FIGS. 17-18 wouldn't be needed as only one flow meter would be employed.

In some embodiments, each band may have one or more micro GPS transmitters associated therewith that may be configured to ping once per day per GPS giving multiple pings each day collectively. This may conserve battery life for up to 4 years of use without charge or battery change. The user can track the assets using the application in order to locate assets, confirm time on job for clients and/or to identify where an asset is when in route. Embodiments may also allow the user to manage employees while between the office and jobsite. In some embodiments, the system may include an RFID tag in one of the bands that may store information on hose manufacture date, warranty date, purchase, helping with inventory count for taxes, etc.

Figure 19:
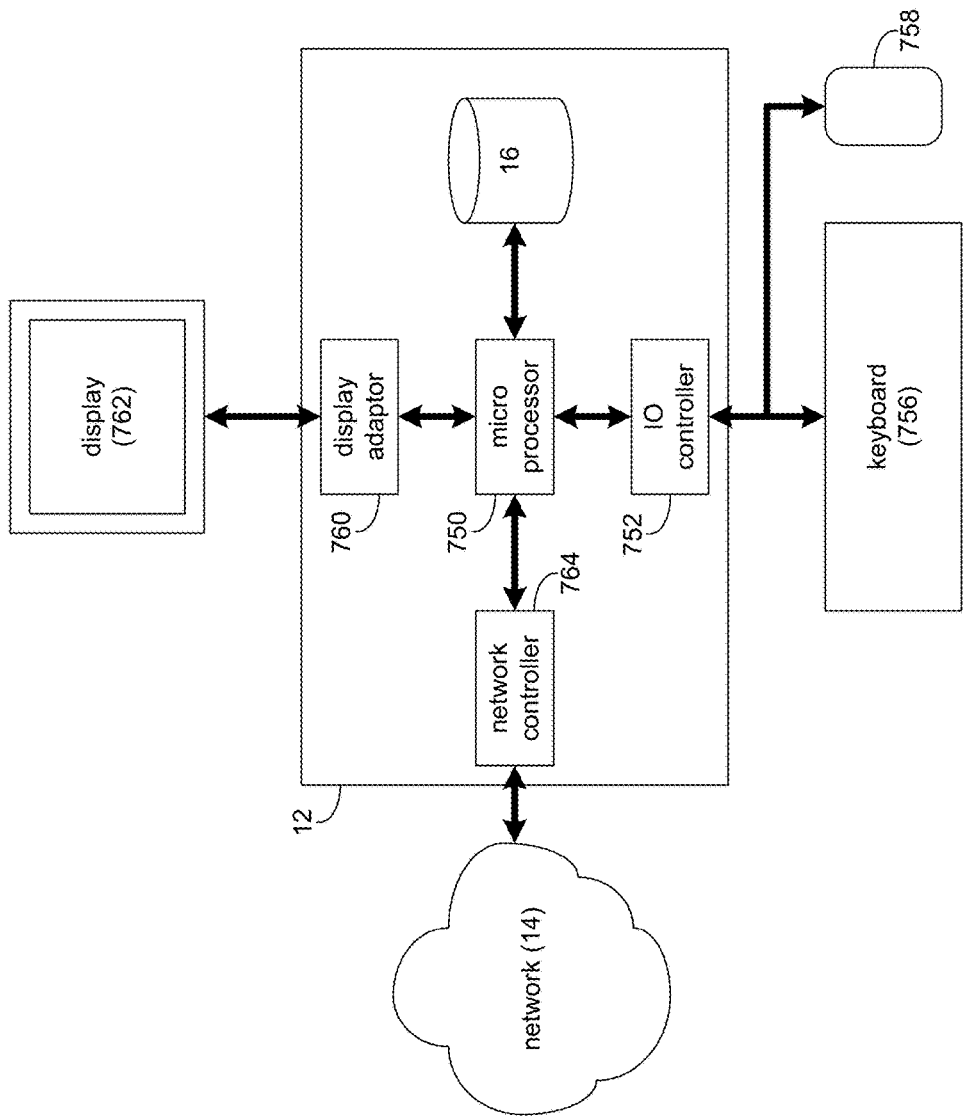
FIG. 19 is a diagrammatic view of a computing device according to an embodiment of the present disclosure.

Referring also to FIG. 19, there is shown a diagrammatic view of computing system 12 that may be used in accordance with mobile monitoring process 10. While computing system 12 is shown in this figure, this is for illustrative purposes only and is not intended to be a limitation of this disclosure, as other configuration are possible. For example, any computing device capable of executing, in whole or in part, mobile monitoring process 10 may be substituted for computing device 12 within FIG. 19, examples of which may include but are not limited to client electronic devices 28, 30, 32, 34 and/or mobile communication unit 60.

Computing system 12 may include microprocessor 750 configured to e.g., process data and execute instructions/code for mobile monitoring process 10. Microprocessor 750 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 752 may be configured to couple microprocessor 750 with various devices, such as keyboard 756, mouse 758, USB ports (not shown), and printer ports (not shown). Display adaptor 760 may be configured to couple display 762 (e.g., a CRT or LCD monitor) with microprocessor 750, while network adapter 764 (e.g., an Ethernet adapter) may be configured to couple microprocessor 750 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 750) of a general purpose computer/special purpose computer/other programmable data processing apparatus (e.g., computing device 12), such that the instructions, which execute via the processor (e.g., processor 750) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A mobile monitoring system comprising:
a mobile communications unit;
a plurality of global positioning system "GPS" enabled sensors each configured to wirelessly transmit geographic data, liquid level data, and gas sensing data to the mobile communications unit, wherein the plurality of GPS enabled sensors include a plurality of gas sensing chambers configured to be filled with an atmosphere sample to determine Chlorine data and Hydrogen Sulfide data of the gas sensing data, wherein a separate gas sensing chamber of the plurality of gas sensing chambers is used for each of the Chlorine data and the Hydrogen Sulfide data;
a database configured to store a location associated with the mobile communication unit, the database further configured to receive the geographic data and liquid level data from the plurality of GPS enabled sensors, the database also configured to store baseline site survey data corresponding to the location associated with the mobile communications unit; and
an application configured to display information associated with the mobile monitoring system at a user's mobile device, wherein the information displayed includes a graphical visualization of a liquid level within at least one of a tank, barrel, or pond, and wherein a graphical user interface allows for a user-selectable display of one or more historical liquid levels and configured to automatically open and display information associated with at least one of the plurality of GPS enabled sensors based upon, at least in part, proximity of the user's mobile device to the at least one of the plurality of GPS enabled sensors.

2. The mobile monitoring system of claim 1 wherein the liquid level is at least one of a storage tank level or a pond level.

3. The mobile monitoring system of claim 1 wherein the information includes at least one of the baseline site survey data, the liquid level, and one or more alarms triggered at the location.

4. The mobile monitoring system of claim 1 wherein the information is updated graphically in real-time.

5. The mobile monitoring system of claim 1 wherein the site survey data is received from an autonomous drone.

6. The mobile monitoring system of claim 5 further comprising:
generating, via the application, a three-dimensional map based upon, at least in part, the site survey data.

7. The mobile monitoring system of claim 1 wherein the mobile communications unit is solar-powered.

8. The mobile monitoring system of claim 7 wherein the mobile communications unit is configured to transmit information to a central command center.

9. The mobile monitoring system of claim 6 further comprising:
allowing, via the application, a visual comparison of the baseline site survey data with real-time updated data.

10. A mobile monitoring method comprising:
providing a mobile communications unit;
detecting geographic data, liquid level data, and gas sensing data from a plurality of global positioning system "GPS" enabled sensors, wherein the gas sensing data includes Chlorine data and Hydrogen Sulfide data, wherein the plurality of GPS enabled sensors include a plurality of gas sensing chambers configured to be filled with an atmosphere sample to determine the Chlorine data and Hydrogen Sulfide data, wherein a separate gas sensing chamber of the plurality of gas sensing chambers is used for each of the Chlorine data and the Hydrogen Sulfide data, wherein each of plurality of GPS enabled sensors includes a power switch configured to be automatically switched on when the GPS enabled sensor is installed in a container and configured to be automatically switched off when the GPS enabled sensor is uninstalled in the container;
wirelessly transmitting the geographic data, the liquid level data, and the gas sensing data from the plurality of global positioning system "GPS" enabled sensors to the mobile communications unit;
storing a location associated with the mobile communication unit at a database, the database further configured to receive the geographic data, the liquid level data, and the gas sensing data from the plurality of GPS enabled sensors, the database also configured to store baseline site survey data corresponding to the location associated with the mobile communications unit; and
displaying information associated with the mobile communications unit at an application at a user's mobile device, wherein the information displayed includes a graphical visualization of a liquid level within at least one of a tank, barrel, or pond.

11. The mobile monitoring method of claim 10 wherein the liquid level is at least one of a storage tank level or a pond level.

12. The mobile monitoring method of claim 10 wherein the information includes at least one of the baseline site survey data, the liquid level, and one or more alarms triggered at the location.

13. The mobile monitoring method of claim 10 further comprising:
graphically updating the information in real-time.

14. The mobile monitoring method of claim 10 further comprising:
receiving the baseline site survey data from an autonomous drone.

15. The mobile monitoring method of claim 14 further comprising:
generating, via the application, a three-dimensional map based upon, at least in part, the site survey data.

16. The mobile monitoring method of claim 10 wherein the mobile communications unit is solar-powered.

17. The mobile monitoring method of claim 16 further comprising:
transmitting information from the mobile communications unit to a central command center.

18. The mobile monitoring method of claim 15 further comprising:
allowing, via the application, a visual comparison of the baseline site survey data with real-time updated data.

19. A mobile monitoring system comprising:
a mobile communications unit;
a plurality of global positioning system "GPS" enabled sensors each configured to wirelessly transmit geographic data, liquid level data, and gas sensing data to the mobile communications unit, wherein the plurality of GPS enabled sensors include a plurality of gas sensing chambers configured to be filled with an atmosphere sample to determine Chlorine data and Hydrogen Sulfide data of the gas sensing data, wherein a separate gas sensing chamber of the plurality of gas sensing chambers is used for each of the Chlorine data and the Hydrogen Sulfide data, wherein each of plurality of GPS enabled sensors includes a power switch configured to be automatically switched on when the GPS enabled sensor is installed in a container and configured to be automatically switched off when the GPS enabled sensor is uninstalled in the container;
a database configured to store a location associated with the mobile communication unit, the database further configured to receive the geographic data and liquid level data from the plurality of GPS enabled sensors, the database also configured to store baseline site survey data corresponding to the location associated with the mobile communications unit; and
an application configured to display information associated with the mobile monitoring system at a user's mobile device, wherein the information displayed includes a graphical visualization of a liquid level within at least one of a tank, barrel, or pond, and wherein a graphical user interface allows for a user-selectable display of one or more historical liquid levels and configured to automatically open and display information associated with at least one of the plurality of GPS enabled sensors based upon, at least in part, proximity of the user's mobile device to the at least one of the plurality of GPS enabled sensors.

* * * * *